United States Patent
Lee et al.

(10) Patent No.: US 6,956,964 B2
(45) Date of Patent: Oct. 18, 2005

(54) APPARATUS FOR PRODUCING REAL-TIME ANAGLYPHS

(75) Inventors: Ruen-Rone Lee, Hsinchu (TW); Hsi-Jou Deng, Hsinchu (TW); Chin Sung Lee, Kaohsiung Hsien (TW)

(73) Assignee: Silicon Intergrated Systems Corp., Hsin Chu (TW)

( * ) Notice: Subject to any disclaimer, the term of this patent is extended or adjusted under 35 U.S.C. 154(b) by 501 days.

(21) Appl. No.: 09/986,375

(22) Filed: Nov. 8, 2001

(65) Prior Publication Data

US 2003/0086601 A1 May 8, 2003

(51) Int. Cl.[7] .............................................. G06K 9/00
(52) U.S. Cl. ..................... 382/154; 382/162; 382/163; 345/419; 345/473; 348/42; 348/60
(58) Field of Search ............................... 382/154, 162, 382/163; 345/419, 473; 348/42, 60

(56) References Cited

U.S. PATENT DOCUMENTS

| | | | |
|---|---|---|---|
| 4,625,290 A | * | 11/1986 | White ........................ 345/419 |
| 4,734,756 A | * | 3/1988 | Butterfield et al. ............ 348/43 |
| 5,748,199 A | * | 5/1998 | Palm .......................... 345/473 |

2002/0021832 A1 * 2/2002 Dawson ...................... 382/154

FOREIGN PATENT DOCUMENTS

| | | |
|---|---|---|
| CN | 1108849 A | 9/1995 |
| CN | 2443393 Y | 8/2001 |

* cited by examiner

Primary Examiner—Bhavesh M. Mehta
Assistant Examiner—John Strege
(74) Attorney, Agent, or Firm—Birch, Stewart, Kolasch & Birch, LLP

(57) ABSTRACT

An apparatus is provided to produce a real-time anaglyph, comprising a graphics engine, a memory and an anaglyph generator. The graphics engine provides a sync signal and generates a left eye image and a right eye image in accordance with a horizontal offset calculated from a 3D graphic animation, wherein the horizontal offset between the left and the right eye images creates illusion of depth. The left eye image and the right eye image are temporarily stored in the memory. The anaglyph generator then fetches the left eye image and the right eye image from the memory in response to the sync signal, for producing a filtered left image and a filtered right image. As such, each filtered image is respectively tinted with one of the complementary colors. By viewing through a pair of anaglyph glasses, the filtered left and the filtered right images can thus create perception of depth.

20 Claims, 5 Drawing Sheets

APPARATUS FOR PRODUCING REAL-TIME ANAGLYPHS

FIELD OF THE INVENTION

The present invention relates generally to the field of three-dimensional (3D) computer graphics and, in particular, to an apparatus for producing real-time anaglyphs that create the perception of depth when viewed through anaglyph spectacles.

BACKGROUND OF THE INVENTION

A problem with computer systems for generating images is their need to emulate natural 3D images compared to images that lack realism due to the absence of depth cues. Many techniques have been devised and developed for producing stereoscopic images to achieve 3D effect. One technique is to provide left and right eye images for a single two-dimensional image and displaying them alternately. A viewer is provided with liquid crystal shuttered spectacles to view the left and the right eye images. The shuttered spectacles are synchronized with the display signal to admit one eye at a time to view the proper image. More specifically, the liquid crystal shutter for the right eye is opened when the right eye image is displayed and the liquid crystal shutter for the left eye is opened when the left eye image is displayed. In this way, the observer's brain merges or fuses the left and right eye images to create the perception of depth. The amount of offset between the elements of left and right eye images determines the depth at which the elements are perceived in the resulting stereo image. Another technique for providing stereoscopic view is the use of anaglyph. An anaglyph is an image generally consisting of two distinctly colored, and preferably, complementary colored, images. Theory of anaglyph is the same as the technique described above—the observer is provided with separate left and right eye images and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

SUMMARY OF THE INVENTION

It is one object of the present invention to provide an apparatus for producing a real-time anaglyph in a personal computer.

It is another object of the present invention to provide an apparatus employing animation pictures generated from a 3D graphics accelerator used in a personal computer to create real-time stereoscopic images.

The present invention is an apparatus for producing a real-time anaglyph. The disclosed apparatus comprises a graphics engine, a memory and an anaglyph generator. The graphics engine provides a sync signal and generates a left eye image and a right eye image in accordance with a horizontal offset calculated from 3D graphic animation, in which the horizontal offset between the left and the right eye images creates the illusion of depth. The memory is used as a buffer to temporarily store the left eye image and the right eye image. The anaglyph generator then fetches the left eye image and the right eye image from the memory in response to the sync signal, for producing a filtered left image and a filtered right image. In this way, each filtered image is respectively tinted with one of the complementary colors. By viewing through a pair of anaglyph glasses, the filtered left and the filtered right images can thus create perception of depth.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 1:
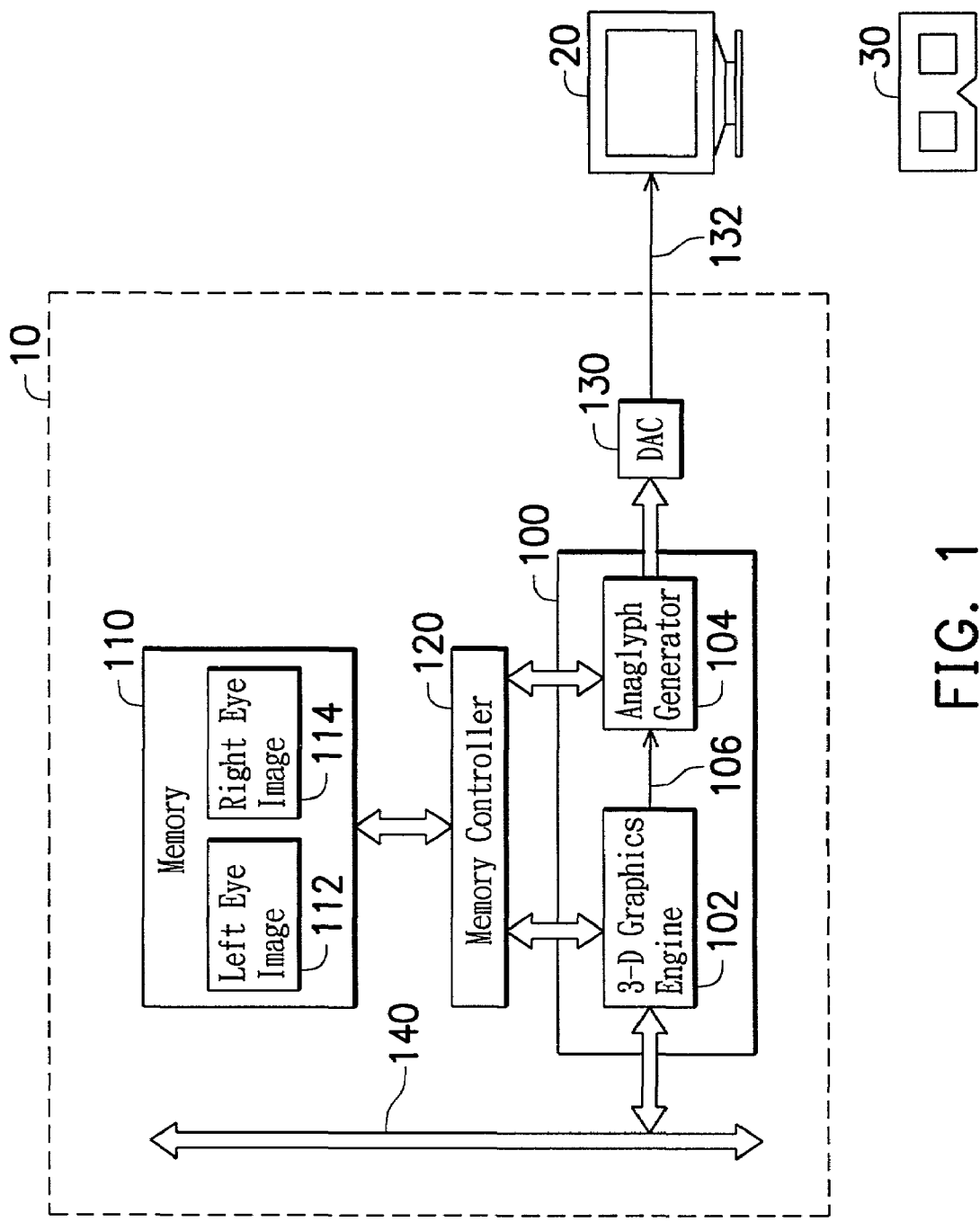
FIG. 1 is a block diagram illustrating a preferred embodiment in accordance with the present invention.

As illustrated in FIG. 1, a graphics display device 10 of a personal computer provides video signals 132 to a monitor 20. Graphics display device 10 includes a graphics processor 100, a memory 110, a memory controller 120, and a digital-to-analog converter (DAC) 130. According to the present invention, graphics processor 100 further comprises a 3D graphics engine 102 and an anaglyph generator 104. 3D graphics engine 102 and anaglyph generator 104 both access memory 110 by way of memory controller 120. 3D graphics engine 102, for example, receives graphic data and commands from CPU via PCI or AGP bus 140. In normal operation, 3D graphics engine 102 renders a series of 3D animations by calculating the graphic data. Each 3D image in the series of animations is pre-stored in memory 110 to maximize computing power of 3D graphics engine 102. Graphics processor 100 continuously fetches the pre-stored digital images and transmits them to DAC 130. In order to display the transmission on monitor 20, DAC 130 converts the digital images to analog video signals 132. In addition to rendering the 3D animations, 3D graphics engine 102 also calculates one horizontal offset for each one of 3D graphic animations if the stereo function of graphics processor 100 is activated. Further, 3D graphic engine 102 provides a sync signal 106 and generates a left eye image 112 and a right eye image 114 in accordance with the horizontal offset, in which the horizontal offset between the left and the right eye images provides illusion of depth. The left eye image 112 and the right eye image 114 are stored in memory 110 for the following operation. Because the left and right eye images generated from the previous operation are buffered in memory 110, 3D graphics engine 102 is available to perform the next operation to maximize the resource of 3D graphics engine 102. For the reasons explained above, the apparatus disclosed in present invention can achieve production of real-time anaglyphs.

With continued reference to FIG. 1, anaglyph generator 104 fetches left eye image 112 and right eye image 114 from the memory 110 in response to sync signal 106 to produce a filtered left image and a filtered right image respectively. As such, the filtered left image is tinted with one color and the filtered right image is tinted with another color, wherein these two colors are complementary colors. Anaglyph generator 104, in accordance with sync signal 106, alternately outputs the filtered left and right images to DAC 130. By converting digital signals into analog video signals 132, the filtered left and right images are displayed on monitor 20. A viewer wearing a pair of anaglyph glasses 30 views the images through lenses of matching colors, and one eye sees one image while the other eye sees the other image, thus giving the appearance of depth.

Figure 2:
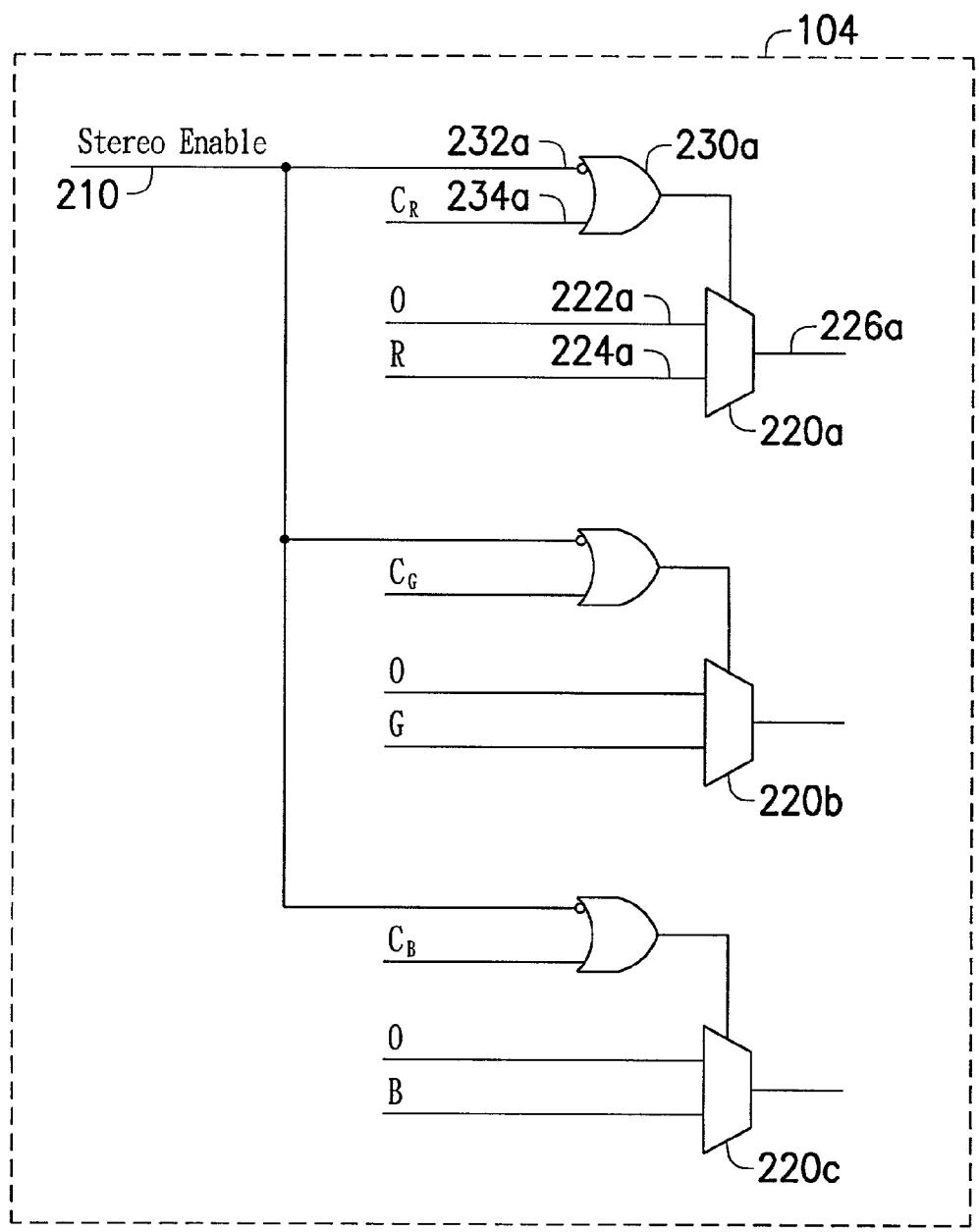
FIG. 2 is a block diagram illustrating an expanded view of the anaglyph generator.

With reference to FIG. 2, a preferred embodiment of anaglyph generator 104 will become more apparent from the following detailed description. When processing color images using computers, it is common to separate an image into primary colors, e.g., red (R), green (G) and blue (B) components. Primary colors are basic colors that can be mixed together to produce other colors. In FIG. 2, anaglyph generator 104 comprises three multiplexers, 220a, 220b and 220c. Each multiplexer is responsible for filtering one color component of an image respectively. Multiplexers 220a, 220b and 220c have substantially the same arrangement. For example, zero (0) is applied to one input port 222a of multiplexer 220a and red (R) component of an image is applied to the other input port 224a of multiplexer 220a. Output port 226a of multiplexer 220a provides output to a filtered image as its the reds in accordance with a stereo enable signal 210 and a control signal $C_R$. Stereo signal 210 and stereo signal 210 control signal $C_R$ are respectively applied to input terminals 232a and 234a of a logic gate 230a. As shown in FIG. 2, anaglyph generator 104 is enabled to produce the filtered left image and the filtered right image if the stereo enable signal 210 is asserted.

In one embodiment, multiplexer 220a filters out the reds from the left eye image when control signal $C_R$ is deasserted, and admits reds from the right eye image when control signal $C_R$ is asserted. Multiplexer 220b filters out the greens from the right eye image when control signal $C_G$ is deasserted, and admits greens from the left eye image when control signal $C_G$ is asserted. Likewise, multiplexer 220c filters out the blues from the right eye image when control signal $C_B$ is deasserted, and admits blues from the left eye image when control signal $C_B$ is asserted. As a result, anaglyph generator 104 separately produces a filtered left image tinted blue-green and a filtered right image tinted red. After that, the filtered left and right images are alternately displayed on monitor 20 at a rate of about 60 images/second for each eye. A viewer is provided with a pair of glasses 30 to view the filtered images through lenses of matching colors. In this manner, the observer sees only the blue-green tinted image with the blue-green lens, and only the red tinted image with the red lens, thus providing separate images to each eye.

In another embodiment, multiplexer 220a filters out the reds from the right eye image when control signal $C_R$ is deasserted, and admits reds from the left eye image when control signal $C_R$ is asserted. Multiplexer 220b filters out the greens from the left eye image when control signal $C_G$ is deasserted, and admits greens from the right eye image when control signal CG is asserted. Similarly, multiplexer 220c filters out the blues from the right eye image when control signal $C_B$ is deasserted, and admits blues from the left eye image when control signal $C_B$ is asserted. Consequently, anaglyph generator 104 separately produces a filtered left image tinted red-blue and a filtered right image tinted green separately. Then, the filtered left and right images are alternately displayed on monitor 20 at a rate of about 60 images/second for each eye. A viewer wearing a pair of glasses 30 views the filtered images through lenses of matching colors. In this way, the observer sees only the red-blue tinted image with the red-blue lens, and only the green tinted image with the green lens, thus providing separate images to each eye.

Figure 3:
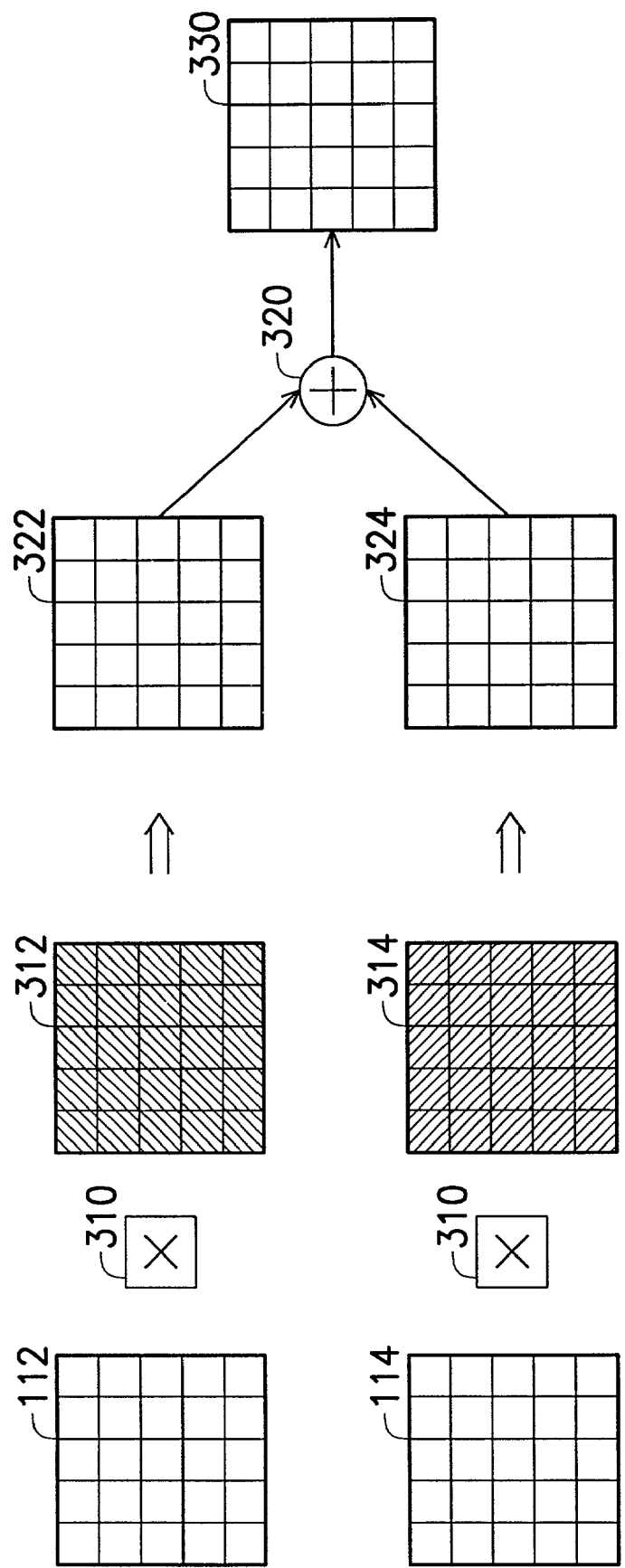
FIG. 3 is a functional illustration of an alternative embodiment for the anaglyph generator.
Figure 5:
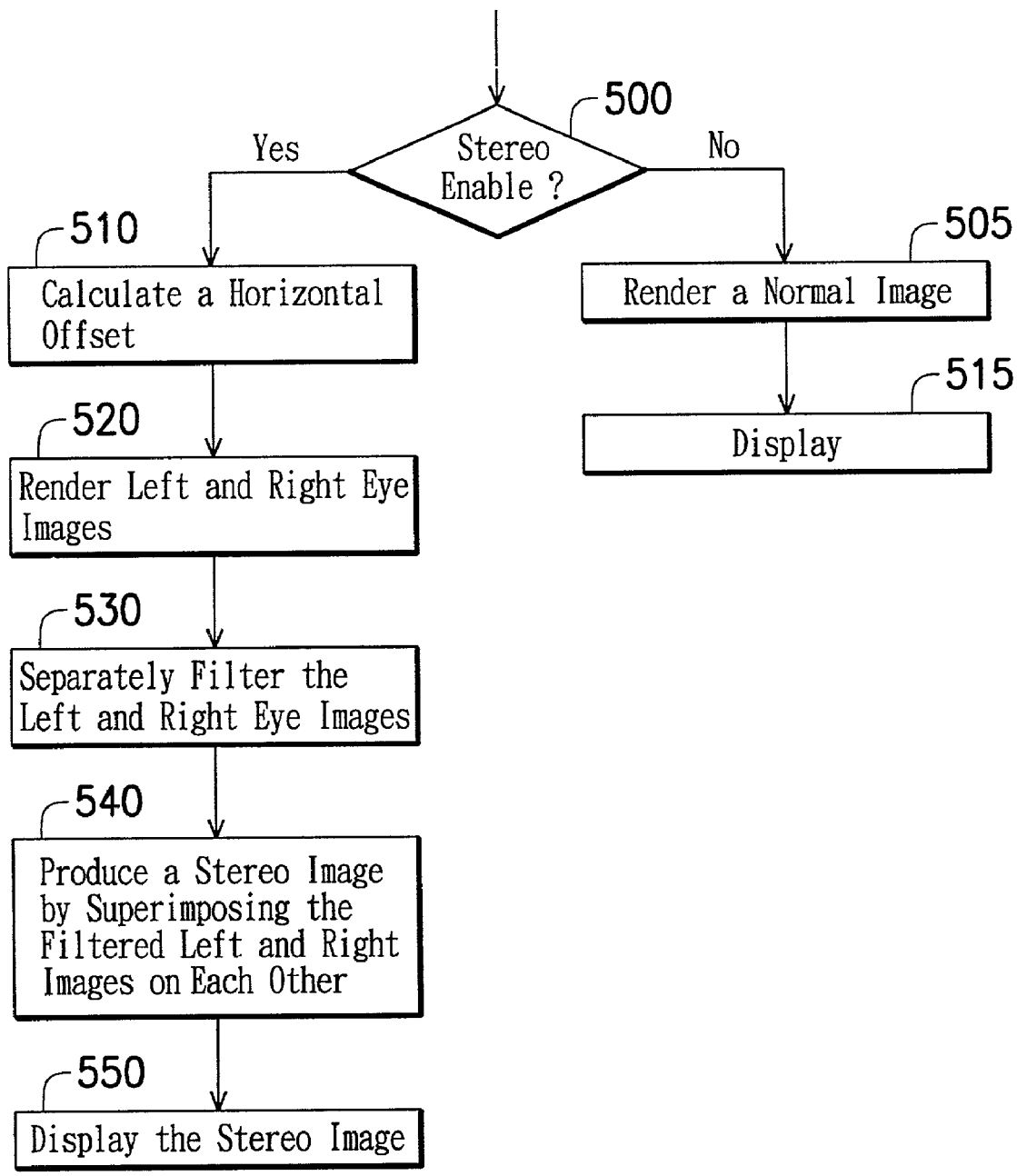
FIG. 5 is a flow chart of the alternative embodiment.

FIG. 3 is a functional illustration of an alternative embodiment for the anaglyph generator 104. To achieve a stereo image consisting of two separate images of the same element in two different colors but horizontally shifted, as depicted, anaglyph generator 104 may comprise an adder 320 and a multiplier 310. With reference to a flow chart as illustrated in FIG. 5, the alternative embodiment of anaglyph generator 104 will become clearer from the following detailed description. If the stereo function of graphics processor 100 is disabled (step 500), as described above, graphics processor 100 renders normal 3D animations (step 505) and displays them on monitor 20 by way of DAC 130 (step 515). If the stereo function of graphics processor 100 is enabled (step 500), a horizontal offset is calculated by 3D graphics engine 102 in graphics processor 100 (step 510). 3D graphics engine 102 then renders a left eye image 112 and a right eye image 114, in which some or all elements of left eye image 112 are horizontally shifted in the degree of horizontal offset relative to the same elements of right eye image 114 (step 520). Thereafter, anaglyph generator 104 employs multiplier 310 to multiply left eye image 112 by a first mask 312 and to multiply right eye image 114 by a second mask 314, for separately producing a filtered left image 322 and a filtered right image 324 (step 530). To produce the stereo image 330, adder 320 manipulates filtered left image 322 and filtered right image 324 to be superimposed on each other (step 540), as depicted in FIG. 3. Then, stereo image 330 consisting of two separate tinted images is displayed in monitor 20 at a rate of about 30 images/second for both eyes. In one embodiment, multiplier 310 blocks the reds of left eye image 112 by first mask 312 to produce blue-green tinted image 322, and blocks the blues and greens of right eye image 114 by second mask 314 to produce red tinted image 324. A viewer is provided with a pair of glasses 30 to view the stereo image 330 through lenses of matching colors. In this manner, the observer sees only the blue-green tinted image with the blue-green lens, and only the red tinted image with the red lens, thus providing separate images to each eye. Because the same elements of the two separate images are shifted horizontally, the observer perceives illusion of depth. In another embodiment, multiplier 310 blocks the greens of left eye image 112 by first mask 312 to produce red-blue tinted image 322, and blocks the reds and blues of right eye image 114 by second mask 314 to produce green tinted image 324. A viewer sees only the red-blue tinted image with the red-blue lens, and only the green tinted image with the green lens, thus providing separate images to each eye. Because the same elements of the two separate images are shifted horizontally, the observer perceives illusion of depth.

Figure 4:
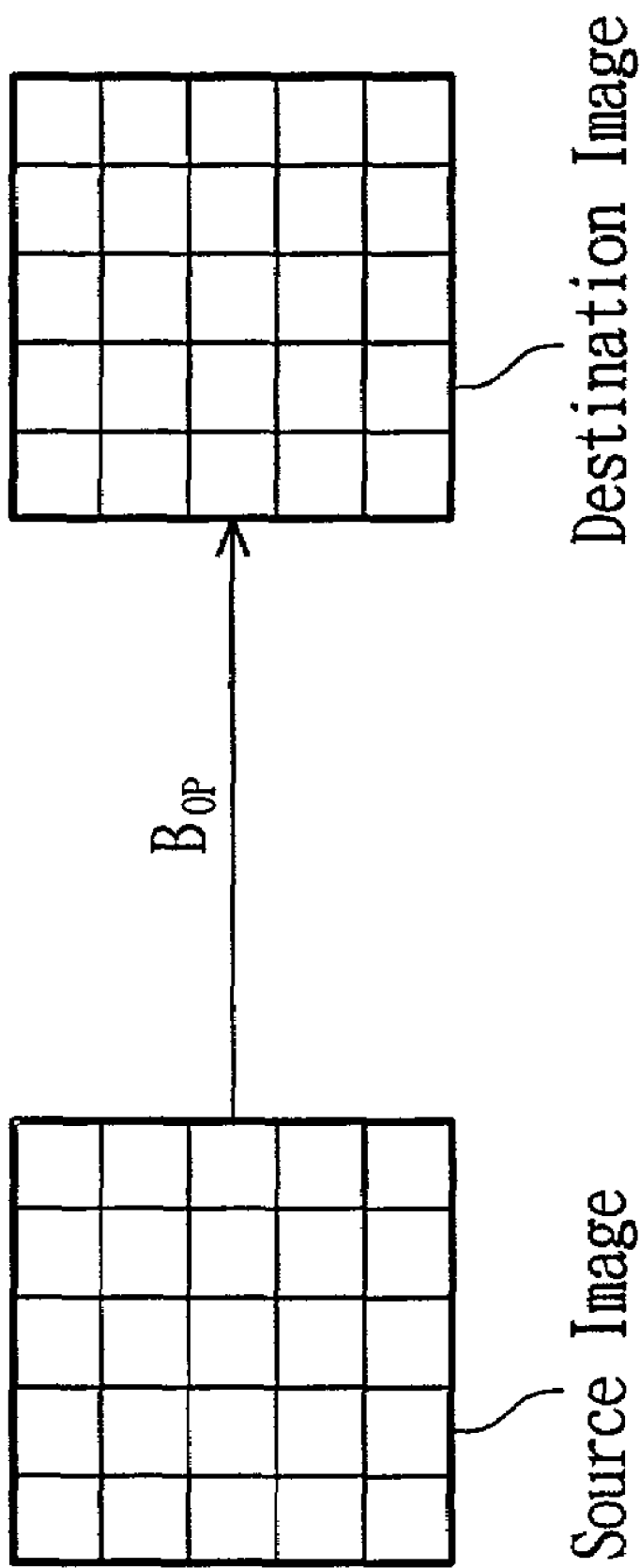
FIG. 4 is a functional illustration of a bit-block transfer operation performed by an adder in the anaglyph generator.

Further, adder 320 performs a bit-block transfer operation ($B_{OP}$) used in computer graphics techniques. $B_{OP}$ is a technique for moving or superimposing pixel blocks in a source image onto a destination image as shown in FIG. 4, and is more efficient than moving or superimposing individual bits or bytes.

Accordingly, an apparatus for producing a real-time anaglyph has been disclosed. It will be apparent that the invention is not limited thereto, and that many modifications and additions may be made within the scope of the invention. Therefore, it is the object of the appended claims to cover all such variations and modifications as come within the true spirit and scope of the invention.

What is claimed is:

1. An apparatus for producing a real-time anaglyph comprising:
   a graphics engine for providing a sync signal and generating a left eye image and a right eye image in accordance with a horizontal offset calculated from a 3D graphic animation, wherein the horizontal offset between the left and the right eye images provides illusion of depth;
   a memory for storing the left eye image and the right eye image; and
   an anaglyph generator fetching the left eye image and the right eye image from the memory in response to the sync signal, for producing as outputs a filtered left image and a filtered right image, whereby the filtered left image is tinted with a first color and the filtered right image is tinted with a second color, in which the first and the second colors are complementary colors.

2. The apparatus of claim 1 wherein the anaglyph generator alternately outputs the filtered left image and the filtered right image in accordance with the sync signal.

3. The apparatus of claim 2 wherein the anaglyph generator comprises:
   a first multiplexer, responsive to a first signal, to filter the reds out of the left eye and the right eye images respectively if the first signal is deasserted, and to admit the reds from the left eye and the right eye images respectively if the first signal is asserted;
   a second multiplexer, responsive to a second signal, to filter the greens out of the left eye and the right eye images respectively if the second signal is deasserted, and to admit the greens from the left eye and the right eye images respectively if the second signal is asserted; and
   a third multiplexer, responsive to a third signal, to filter the blues out of the left eye and the right eye images respectively if the third signal is deasserted, and to admit the blues from the left eye and the right eye images respectively if the third signal is asserted.

4. The apparatus of claim 3 wherein the first color is a blue-green color and the second color is a red color.

5. The apparatus of claim 4 wherein the first multiplexer filters the reds out of the left eye image and the second and the third multiplexers admit the greens and the blues from the left eye image, respectively, by deasserting the first signal and asserting the second and the third signals, to generate the filtered left image tinted blue-green.

6. The apparatus of claim 4 wherein the first multiplexer admits the reds from the right eye image and the second and the third multiplexers filter the greens and the blues out of the right eye image, respectively, by asserting the first signal and deasserting the second and the third signals, to generate the filtered right image tinted red.

7. The apparatus of claim 4 wherein the filtered left image and the filtered right image, alternately output from the anaglyph generator in accordance with the sync signal, are viewed through a pair of glasses having a blue-green lens over one eye and a red lens over the other eye, thus creating perception of depth.

8. The apparatus of claim 3 wherein the first color is a red-blue color and the second color is a green color.

9. The apparatus of claim 8 wherein the second multiplexer filters the greens out of the left eye image and the first and the third multiplexers admit the reds and the blues from the left eye image, respectively, by deasserting the second signal and asserting the first and the third signals, to generate the filtered left image tinted red-blue.

10. The apparatus of claim 8 wherein the second multiplexer admits the greens from the right eye image and the first and the third multiplexers filter the reds and the blues out of the right eye image, respectively, by asserting the second signal and deasserting the first and the third signals, to generate the filtered right image tinted green.

11. The apparatus of claim 8 wherein the filtered left image and the filtered right image, alternately output from the anaglyph generator in accordance with the sync signal, are viewed through a pair of glasses having a red-blue lens over one eye and a green lens over the other eye, thus creating perception of depth.

12. The apparatus of claim 1 wherein the anaglyph generator comprises an adder, to manipulate the filtered left image and the filtered right image to be superimposed on each other, to produce a stereo image.

13. The apparatus of claim 12 wherein the anaglyph generator further comprises a multiplier, to multiply the left eye image by a first mask and to multiply the right eye image by a second mask, to separately produce the filtered left image and the filtered right image.

14. The apparatus of claim 13 wherein the multiplier separately blocks the second color of the left eye image by the first mask to produce the filtered left image tinted with the first color, and blocks the first color of the right eye image by the second mask to produce the filtered right image tinted with the second color.

15. The apparatus of claim 12 wherein the adder performs a bit-block transfer operation used in computer graphics techniques.

16. The apparatus of claim 14 wherein the first color is a blue-green color and the second color is a red color.

17. The apparatus of claim 16 wherein the stereo image is viewed through a pair of glasses having a blue-green lens over one eye and a red lens over the other eye, thus creating perception of depth.

18. The apparatus of claim 14 wherein the first color is a red-blue color and the second color is a green color.

19. The apparatus of claim 18 wherein the stereo image is viewed through a pair of glasses having a red-blue lens over one eye and a green lens over the other eye, thus creating perception of depth.

20. The apparatus of claim 1 wherein the anaglyph generator is enabled to produce the filtered left image and the filtered right image if a stereo enable signal is asserted.

* * * * *